US008627310B2

(12) United States Patent
Ashok et al.

(10) Patent No.: US 8,627,310 B2
(45) Date of Patent: Jan. 7, 2014

(54) CAPTURING MULTI-DISK VIRTUAL MACHINE IMAGES AUTOMATICALLY

(75) Inventors: Shamsundar Ashok, Austin, TX (US); Daniel F. De Araujo, Round Rock, TX (US); Daniel N. Nguyen, Cedar Park, TX (US); Minh Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 12/895,237

(22) Filed: Sep. 30, 2010

(65) Prior Publication Data

US 2012/0084768 A1 Apr. 5, 2012

(51) Int. Cl.
*G06F 9/44* (2006.01)

(52) U.S. Cl.
USPC ............................................. 717/174

(58) Field of Classification Search
USPC ............................................. 717/174
See application file for complete search history.

(56) References Cited

U.S. PATENT DOCUMENTS

| | | | |
|---|---|---|---|
| 7,356,679 B1 | 4/2008 | Le et al. | |
| 7,577,722 B1 | 8/2009 | Khandekar et al. | |
| 2008/0082976 A1 | 4/2008 | Steinwagner et al. | |
| 2009/0271589 A1* | 10/2009 | Karpoff et al. | 711/170 |
| 2010/0088699 A1* | 4/2010 | Sasaki | 718/1 |
| 2010/0138830 A1 | 6/2010 | Astete et al. | |
| 2010/0153617 A1* | 6/2010 | Miroshnichenko et al. | 711/6 |
| 2010/0235831 A1* | 9/2010 | Dittmer | 718/1 |
| 2011/0246669 A1* | 10/2011 | Kanada et al. | 709/238 |

OTHER PUBLICATIONS

Habib, "Virtualization with KVM", Feb. 2008, Linux Journal, vol. 2008, Issue 166, pp. 1-5.
Sapuntzakis et al., "Optimizing the Migration of Virtual Computers", Proceedings of the 5th Symposium on Operating Systems Design and Implementation, USENIX Association, 2002, pp. 377-390.
"Cloud Computing", NIST.gov Computer Security Division, 1 page, Aug. 27, 2010.

* cited by examiner

*Primary Examiner* — Philip Wang
(74) *Attorney, Agent, or Firm* — Yee & Associates, P.C.; Matthew B. Talpis (57) ABSTRACT

A plurality of virtual disk images are established on a virtual machine. The virtual machine identifies corresponding network address translations for a plurality of disks, each having a corresponding plurality of data sets. The virtual machine installs the corresponding plurality of data sets to the plurality of virtual disks using the corresponding network address translations. An image of the plurality of disks is created, wherein the image contains the plurality of virtual disks with the plurality of data sets.

18 Claims, 9 Drawing Sheets

CAPTURING MULTI-DISK VIRTUAL MACHINE IMAGES AUTOMATICALLY

BACKGROUND

1. Field

The present disclosure related generally to an improved data processing system and in particular to capturing virtual machine images. Still more particularly, the present disclosure relates to a method and apparatus for automatically capturing multi-disk virtual machine images.

2. Description of the Related Art

A virtual machine image is a virtual representation of a computer, in whole or in part, either physical or virtual. For example, a virtual machine image might contain operating systems, middleware, and end user applications related to one or more computers.

However, capturing virtual machine images is difficult, particularly for multiple disk machines. For example, taking a snapshot of a physical machine with multiple disks may yield one single virtual disk. As a result, the user may lose the ability to swap drives, lose physical disk size, and ultimately may obtain a virtual configuration that does not truly capture the physical machine. The same issue may arise with respect to capturing virtual machines having multiple virtual disks. For these reasons, better techniques for capturing multi-disk virtual machine images are desirable.

SUMMARY

According to one embodiment, a plurality of virtual disk images is established on a virtual machine. The virtual machine identifies corresponding network address translations for a plurality of disks, each having a corresponding plurality of data sets. The virtual machine installs the corresponding plurality of data sets to the plurality of virtual disks using the corresponding network address translations. An image of the plurality of disks is created, wherein the image contains the plurality of virtual disks with the plurality of data sets.

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
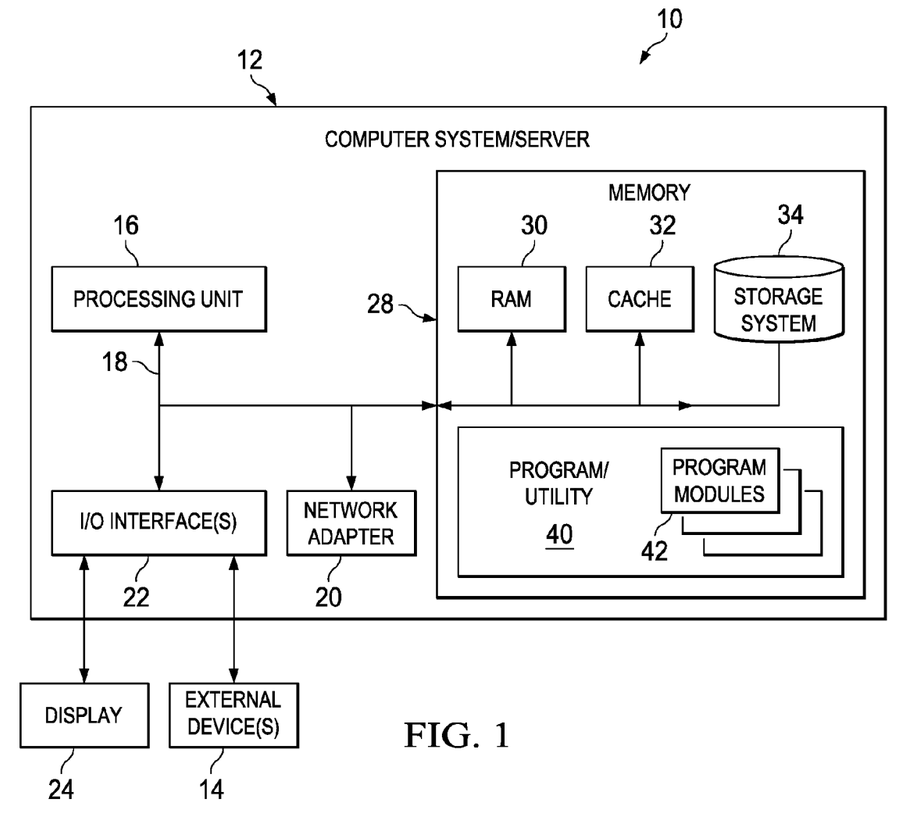
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein above.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing unit 16, a memory 28, and a bus 18 that couples various system components including memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
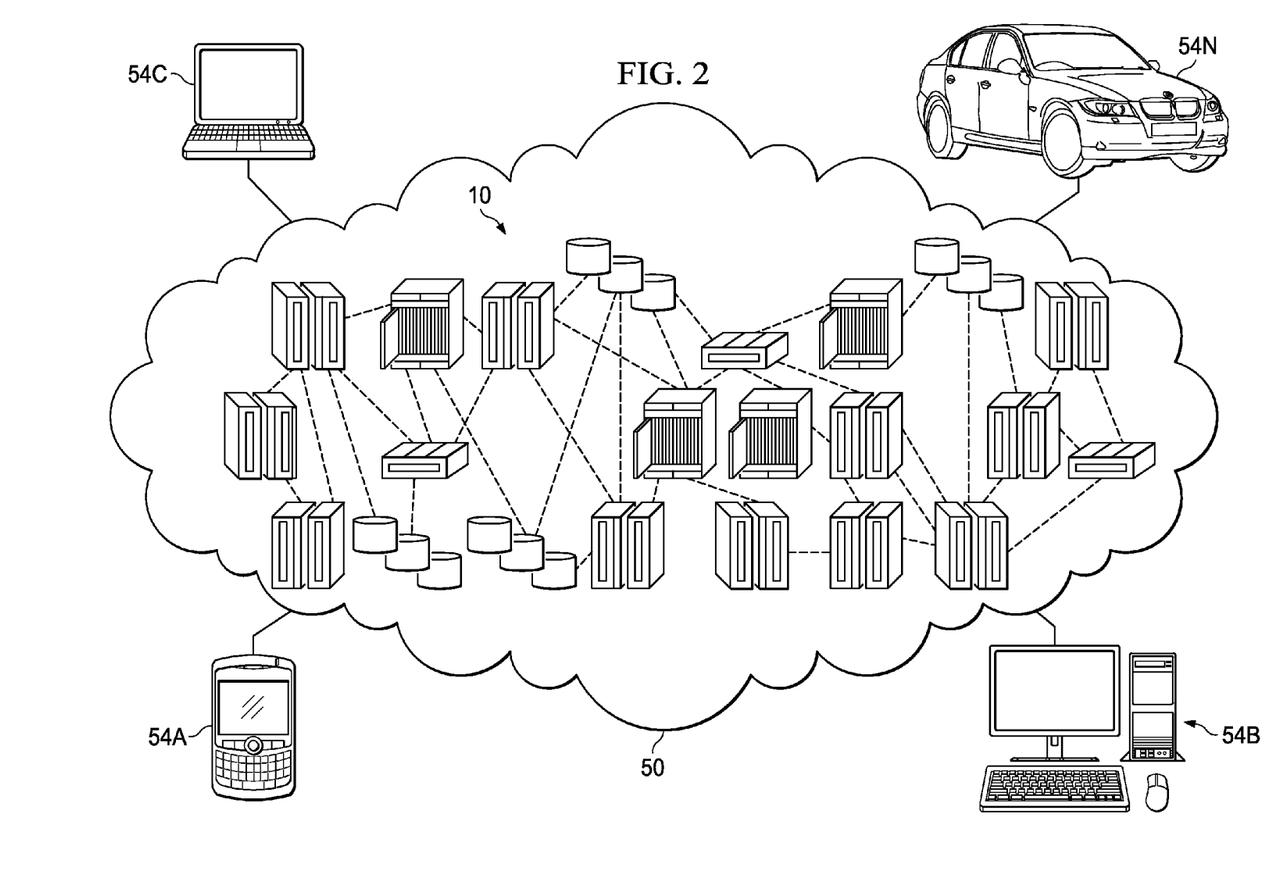
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
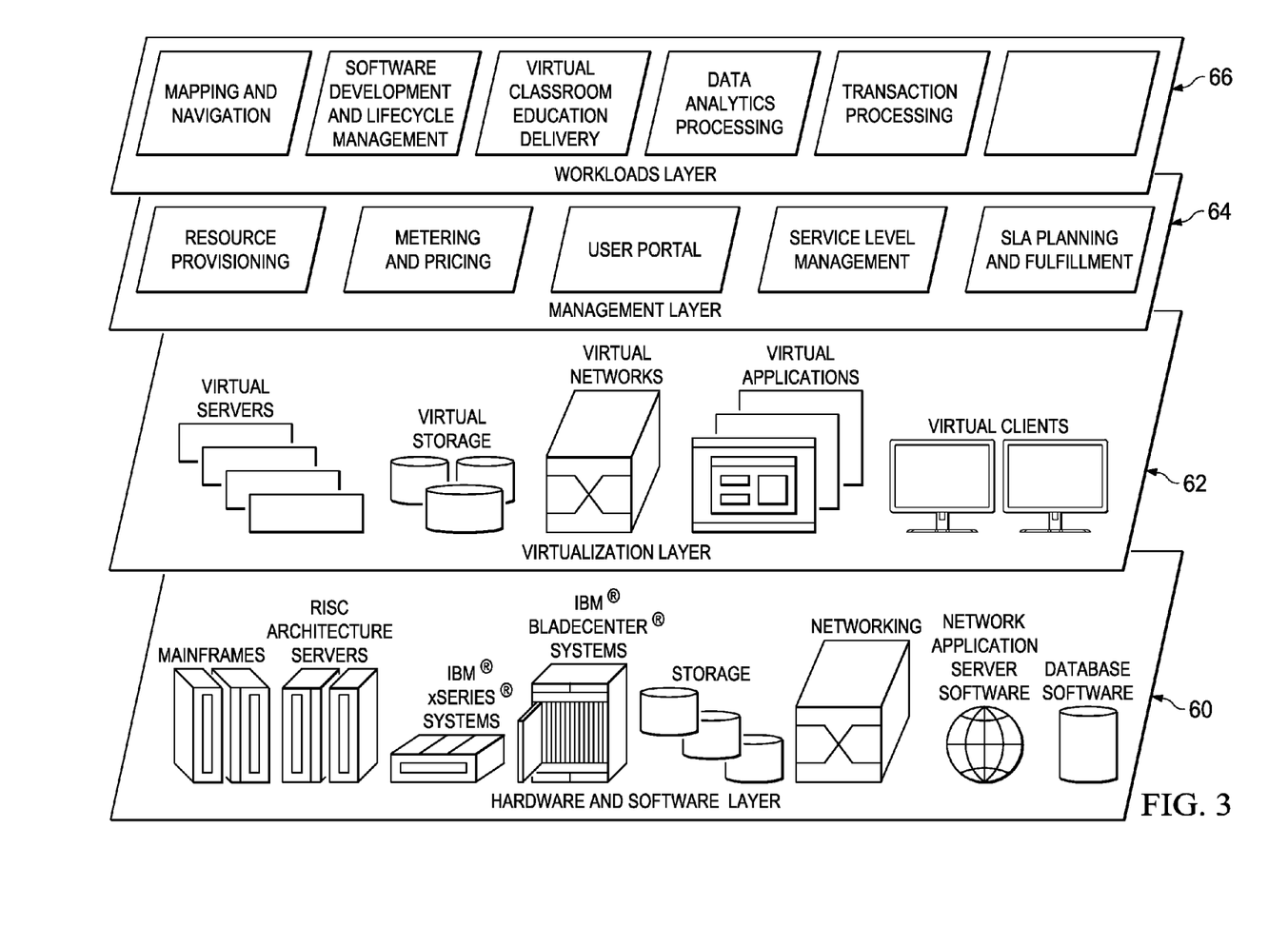
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and generating multiple virtual disks. A plurality of virtual disk images is established on a virtual machine. The virtual machine identifies corresponding network address translations for a plurality of disks, each having a corresponding plurality of data sets. The virtual machine installs the corresponding plurality of data sets to the plurality of virtual disks using the corresponding network address translations. An image of the plurality of disks is created, wherein the image contains the plurality of virtual disks with the plurality of data sets. These embodiments may also be implemented in virtualization layer 62, or in still other embodiments possibly hardware and software layer 60 or management layer 64.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 4:
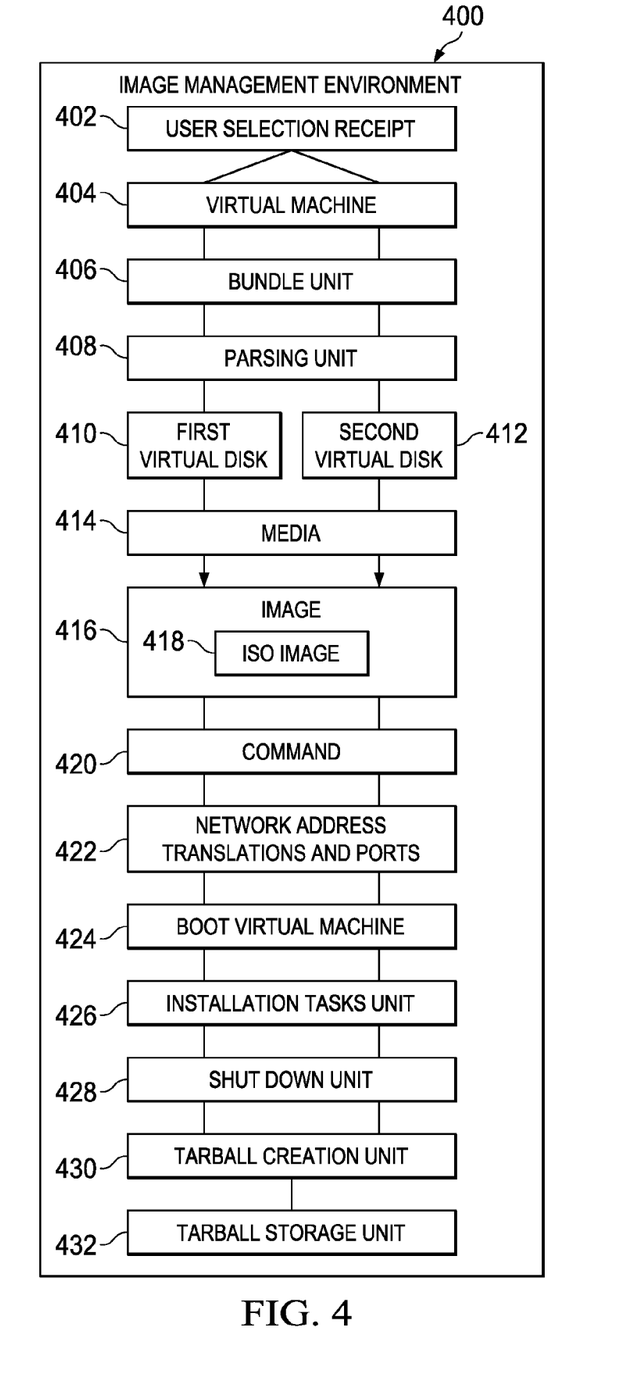
FIG. 4 is a block diagram of an image management environment, in accordance with an illustrative embodiment.

FIG. 4 is a block diagram of an image management environment, in accordance with an illustrative embodiment. The image management environment 400 shown in FIG. 4 may be implemented using one or more data processing systems or networks, such as those shown in FIGS. 1 through 3. The exemplary process described in FIG. 4 is non-limiting, as other embodiments are described further herein. The processes are described as being performed by "units," which may refer to hardware or software, and may be performed by the same or different entities.

In an embodiment, user selection receipt 402 receives a user selection of software to be installed on a virtual machine 404. Bundle unit 406 bundles the user selections in a specific manner into a bundle. In an embodiment, the specific manner may be any format that allows the virtual system to install an application. For example, while the embodiments described herein may relate to International Organization for Standards (ISO) images, the format could be a tarball, a zip file, any kind of compressed file, or other format useful in a particular situation. The bundle unit then distributes the bundle to devices that will execute the additional processes described below. Parsing unit 408 then parses the bundle.

The embodiments described herein provide a process performing various functions. In an embodiment, the process is performed by an executable (software or hardware) that allows users to create virtual disks. In an embodiment, the executable might be qemu-img, VMware software development kits, or other tools.

Then the process will create first virtual disk 410 and second virtual disk 412, though possibly more or fewer virtual disks may be created. The number of disks is consistent with the user selection made above. For example, if a user specified a disk configuration that included three virtual disks with sizes of 80 gigabytes, and 420 gigabytes, then the process creates corresponding virtual disks. Additionally, if the user specified that a mount/opt command on the third virtual disk, then the configuration process would create a configuration file for the host operating system to consume.

After the virtual disks are created, the process may gather media 414 to be installed on the virtual machine 404. The process then creates image 416, which is preferably an installable image writable to a storage medium. While the embodiments described herein may create and use an International Organization for Standards image 418, other embodiments are contemplated. For example, some other image may be substituted for the International Organization for Standards image. The image may include one or more operating systems, applications to install, patches, disk layouts, or scripts that drive the installation and cleanup of a virtual or physical machine. In an embodiment, the operating system included in the image may be modified such that it contains a boot service that queries the presence of one or more applications and data. For example, a boot service may be configured to query the presence of disk configurations, applications, scripts to install or cleanup data, and pre-created secure shell (SSH) keys.

Once the image 416 is created, the process may issue a command 420 to boot the virtual machine 404 with the installable image. This command may be invoked via command line interface (cli) or an application program interface (API). Additionally, the process may establish network address translations (NATs) and ports 422 on the host operating system such that any request to a specified port may be forwarded to the virtual machine 404. The process may also add any pre-created secure shell keys to its list of authorized keys on the host operating system. Once the virtual machine 404 is booted at boot virtual machine 424, the process may poll the presence of a utility unique identifier file, such as a UUID.done file, which may be used to determine which files to configure or clean up. The process may also determine which virtual machine to configure or cleanup after the stack (contained within the image) has been installed and the virtual machine has booted. In an embodiment, multiple virtual machines may exist, and a utility unique identifier file might be unique to each virtual machine.

Virtual machine 404, which may be the same virtual machine mentioned earlier in the process shown in FIG. 4, may execute on one or more processors. Virtual machine 404 further may be implemented on a web-based console or an application running on a host operating system, and further may be executed locally or remotely. In another embodiment, a physical machine might replace virtual machine 404. In an embodiment, virtual machine 404 may be used to install the operating system or application stack, or both. In this case, the user may log in to the virtual machine 404 to perform customization, cleanup, shutdown, or other functions either alone or in combination.

Upon startup of the virtual machine 404, a number of installation tasks may be performed by installation tasks unit 426. Exemplary installation tasks are described below. For example, the first virtual disk 410 and second virtual disk 412 may be formatted and partitioned. The operating system may then be installed. Subsequently, the virtual machine 404 may pivot the root directory to boot the operating system. While the operating system is booting, the virtual machine 404 may invoke a boot process that checks for the presence of installable media on the image 418. If such media exists, the boot process may relinquish control to installation scripts.

Installation tasks unit 426 then performs installation of data onto the virtual machine and the virtual disks. In particular, the installation scripts may install the applications and media, install any patches included with the image, and run any post installation tasks. After the installation is complete, another script on the image may add the pre-created secure shell key or keys to the list of keys authorized for use on the virtual machine 404. The script may also configure and start network. The script may also perform a secure shell into the host operating system using the pre-created secure shell key and write a utility unique identifier done file (UUID.done file).

Turning now from the functions of the exemplary installation tasks unit 426, once the utility unique identifier done file is detected by the host operating system, the shutdown unit 428 may be invoked. The shutdown unit 428 may invoke a number of processes. For example, the host operating system may perform a secure shell into the virtual machine 404 and run a shutdown command. Upon shutdown, the virtual machine 404 may, by use of the same scripts on the image, perform a number of other shutdown tasks. Other shutdown tasks include removal of the secure shell keys, removal of any data not required by the virtual machine 404, cleanup of residual installation files, removal of network configurations, removal of the boot service so that no other applications or data may be installed, and other tasks. During shut down of the virtual machine virtual machine 404, the host operating system may poll to determine whether the virtual machine has shut down completely. Upon halt, the host operating system may add any scripts of configuration files usable by the consuming user.

Turning now from the functions of the shutdown unit 428, the host operating system may use tarball creation unit 430 to create a tarball and then store the tarball in tarball storage unit 432. A tarball is a storable collection of data and files, sometimes bundled together in a manner which saves space on a storage medium relative to all of the data and files being separately loaded on the storage medium. In an embodiment, the created tarball may be a tarball of the first virtual disk 410 and second virtual disk 412 as well as other files, such as the ones described above. The tarball then may be distributed in a manner consistent with the original virtual or physical disks imaged. Furthermore, the tarball contains the correct data and files in the correct mount points.

The image management environment 400 may be further modified, or may take different forms. For example, in some embodiments, user selection receipt 402, bundle unit 406, parsing unit 408, and media 414 might not be needed before establishing virtual machine 404. First virtual disk 410 and second virtual disk 412 may be replaced by a plurality of virtual disks images on virtual machine 404. In an embodiment, image 416 and command 420 might not be required. In an embodiment, network address translations and ports 420 might be replaced by identifying, by the virtual machine, corresponding network address translations for a plurality of disks (virtual or physical), each having a corresponding plurality of data sets. In a similar embodiment, boot virtual machine 424, installation tasks unit 426, shutdown unit 428, tarball creation unit 430, and tarball storage unit 432 might all be replaced by the following two steps. The virtual machine might install the corresponding plurality of data sets to the plurality of virtual disks using the corresponding network address translations, and creating an image of the plurality of disks, wherein the image contains the plurality of virtual disks with the plurality of data sets. Accordingly, many variations of the environment of FIG. 4 are possible.

Figure 5:
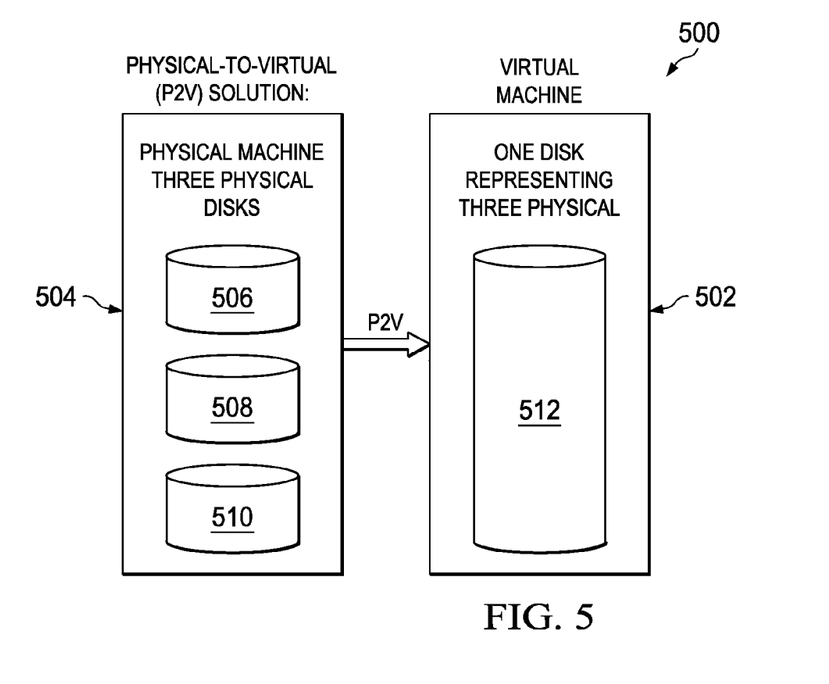
FIG. 5 is a block diagram of a process of generating a virtual machine from a physical machine with multiple disks, in accordance with an illustrative embodiment.

FIG. 5 is a block diagram of a process of generating a virtual machine from a physical machine with multiple disks, in accordance with an illustrative embodiment. The process shown in FIG. 5 may be implemented in one or more data processing systems or networks, such as those shown in FIGS. 1 through 3. The exemplary process described in FIG. 5 is non-limiting, as other embodiments are described further herein.

The process 500 shown in FIG. 5 captures a virtual machine 502 of a physical machine 504. Physical machine 504 includes three physical disks 506, 508, and 510, storing different information such as, for example, a root file system, stored documents, and stored data respectively. Process 500 inspects the current setup of physical machine 504, and then copies its configuration and data to a single virtual disk 512. However, the copying might be performed without regard to the multiple disk partitioning within physical machine 504. As a result, when virtual disk 512 is created, the user may lose the ability to swap drives, lose physical disk size, and may obtain a configuration that does not capture the physical machine 504.

In order to capture the other two disks, the user might have to use process 500 on each of physical disks 506, 508, and 510 separately. However, performing separate processes may be undesirable as additional time and inconvenience may be incurred.

Figure 6:
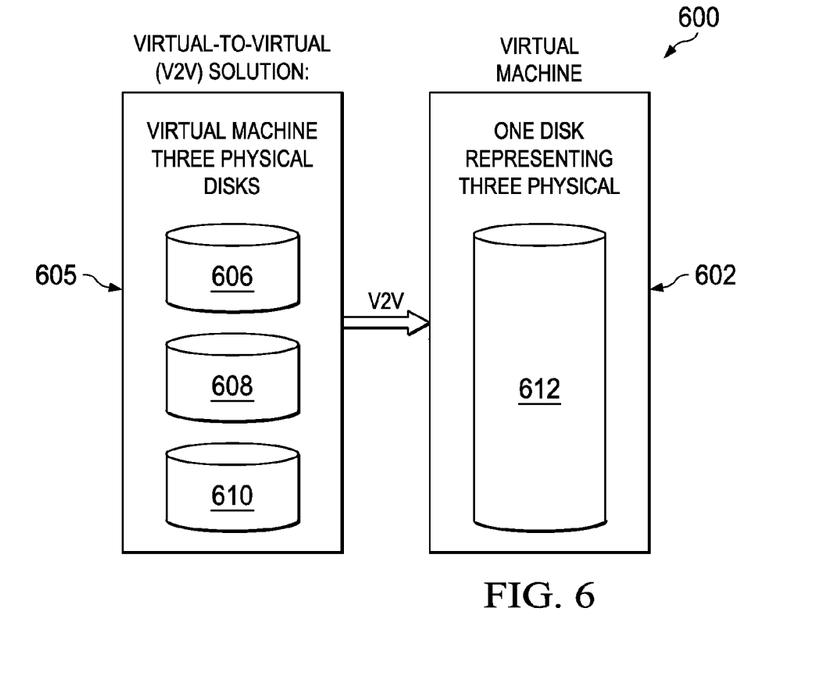
FIG. 6 is a block diagram of a process of generating a virtual machine from a physical machine with multiple disks, in accordance with an illustrative embodiment.

FIG. 6 is a block diagram of a process of generating a virtual machine from a physical machine with multiple disks, in accordance with an illustrative embodiment. The process shown in FIG. 6 may be implemented in one or more data processing systems or networks, such as those shown in FIGS. 1 through 3. The exemplary process described in FIG. 6 is non-limiting, as other embodiments are described further herein.

The process 600 shown in FIG. 6 captures a virtual machine 602 of a virtual machine 604. Virtual machine 604 includes three physical disks 606, 608, and 610, storing different information such as, for example, a root file system, stored documents, and stored data respectively. Process 600 inspects the current setup of virtual machine 604, and then copies its configuration and data to a single virtual disk 612. However, the copying might be performed without regard to the multiple disk partitioning within virtual machine 604. As a result, when virtual disk 612 is created, the user may lose the ability to swap drives, lose physical disk size, and may obtain a configuration that does not capture the virtual machine 604.

In order to capture the other two disks, the user might have to use process 600 on each of physical disks 606, 608, and 610 separately. However, performing separate processes may be undesirable as additional time and inconvenience may be incurred.

Figure 7:
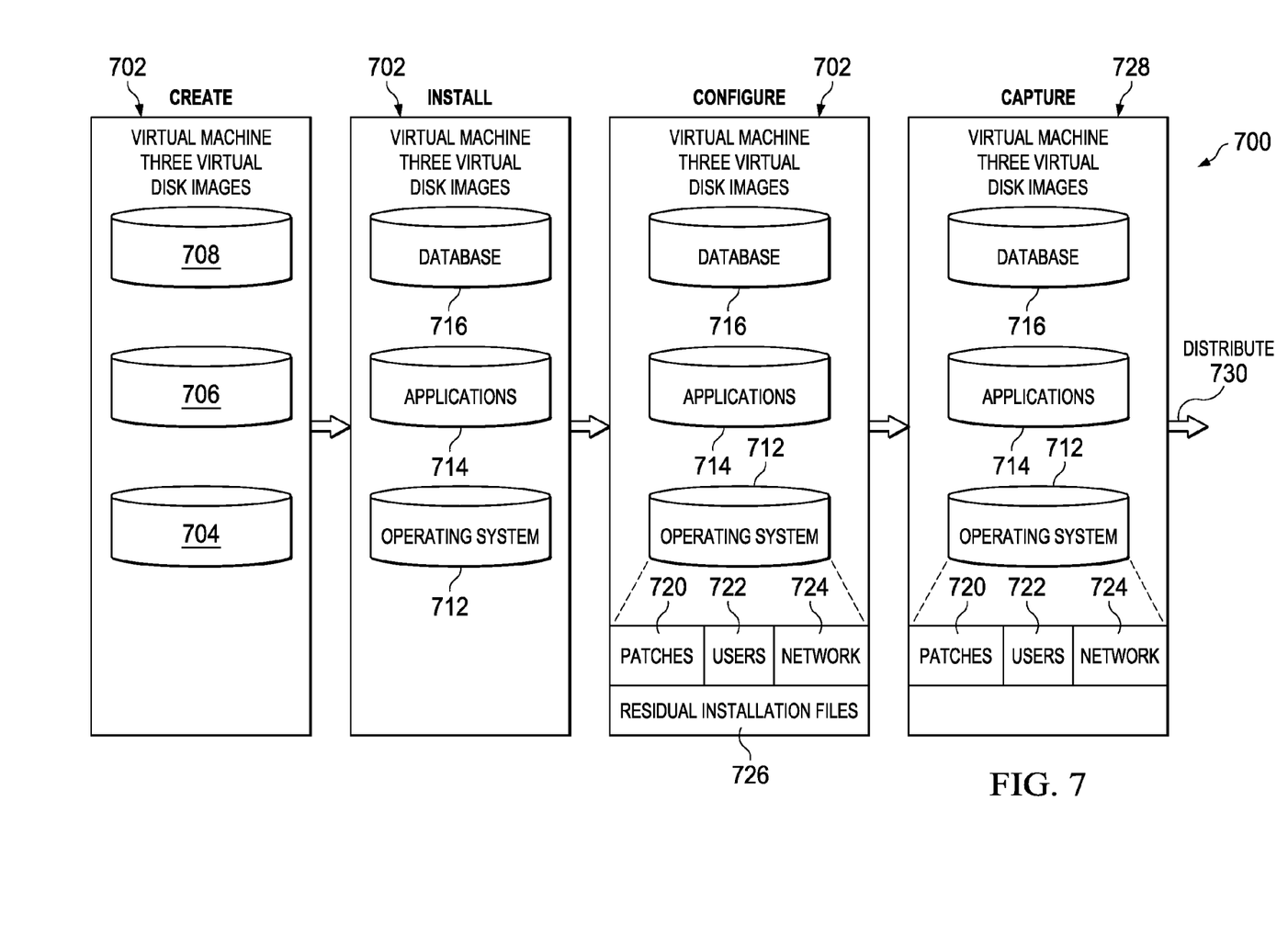
FIG. 7 is a block diagram of a process of generating a virtual machine from a physical machine with multiple disks, in accordance with an illustrative embodiment.

FIG. 7 is a block diagram of a process of generating a virtual machine from a physical machine with multiple disks, in accordance with an illustrative embodiment. The process 700 shown in FIG. 7 may be implemented in one or more data processing systems or networks, such as those shown in FIGS. 1 through 3. The exemplary process described in FIG. 7 is non-limiting, as other embodiments are described further herein. For example, while three virtual disks are shown in FIG. 7, more or fewer virtual disks may be present.

Process 700 begins by creating virtual machine 702. Virtual machine 702 contains the images of virtual disks, including virtual disk 704, virtual disk 706, and virtual disk 708. Each of these virtual disks corresponds to physical disks which are to be imaged. Virtual machine 702 then installs onto the virtual disks the corresponding applications, files, and other data that were present on the corresponding physical disks. Thus, for example, operating system 712 is placed on virtual disk 704, applications 714 are placed on virtual disk 706, and database 716 is placed on virtual disk 708.

The process 700 then configures the virtual machine 702 such that the three virtual disks will fully reflect the corresponding three physical disks. For example, the virtual machine 702 configures patches 720, users 722, network 724, and residual installation files 726 with respect to operating system 712, and possibly also applications 714 and database 716.

The process 700 then captures the configured virtual machine 728, which now includes all three of operating system 712, applications 714, and database 716; and additionally includes patches 720, users 722, and network 724. However, the residual installation files may be cleaned up, in an embodiment. From that point, the captured virtual image may be distributed 730.

Figure 8:
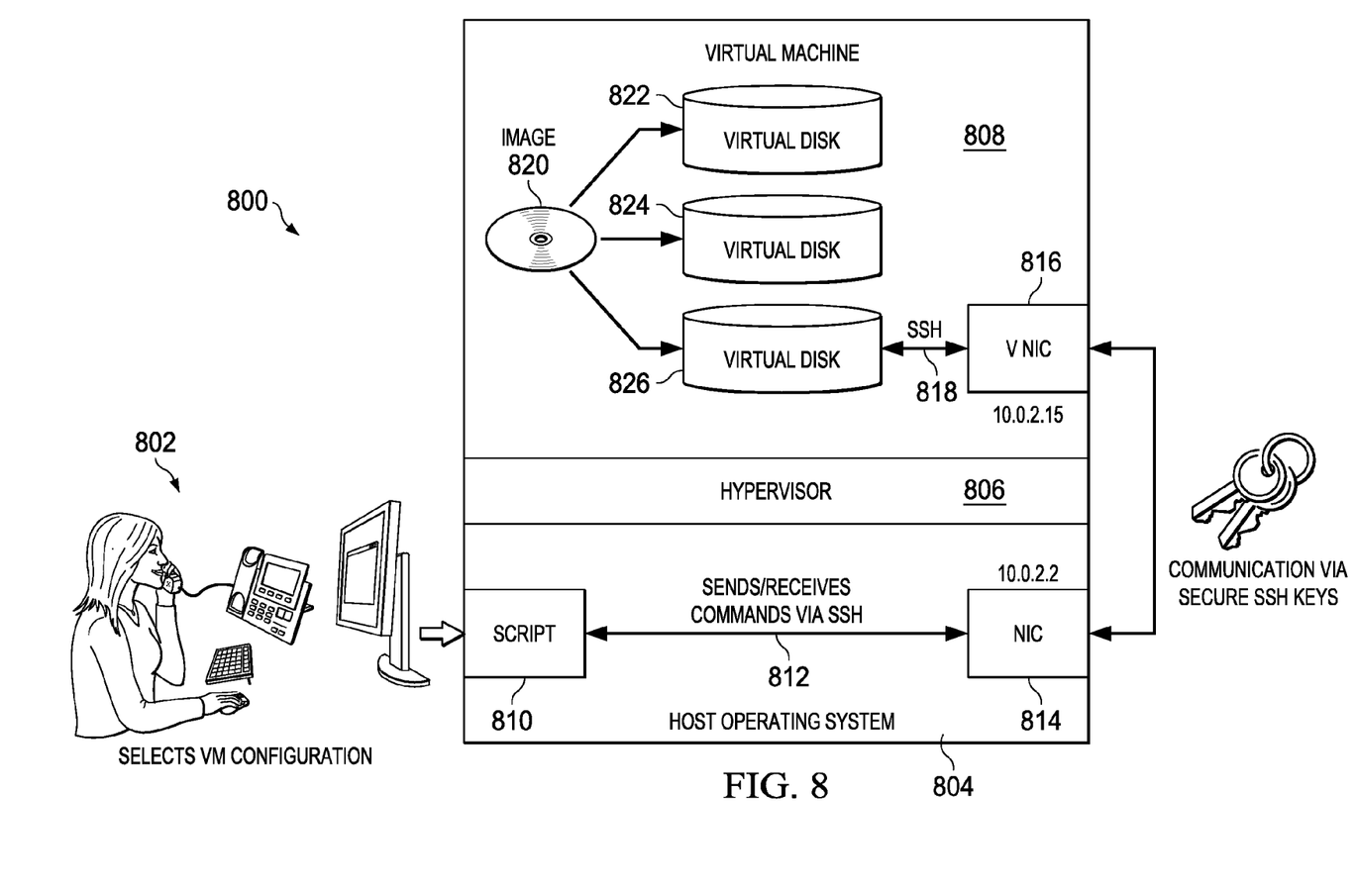
FIG. 8 is a block diagram of a process of generating a virtual machine from a physical machine with multiple disks, in accordance with an illustrative embodiment.

FIG. 8 is a block diagram of a process of generating a virtual machine from a physical machine with multiple disks, in accordance with an illustrative embodiment. The process 800 shown in FIG. 8 may be implemented in one or more data processing systems or networks, such as those shown in FIGS. 1 through 3. The exemplary process described in FIG. 8 is non-limiting, as other embodiments are described further herein. For example, while three virtual disks are shown in FIG. 8, more or fewer virtual disks may be present.

Process 800 begins as the user 802 selects a virtual machine configuration. This configuration is transmitted to the host operating system 804, which uses hypervisor 806 to establish and/or communicate with virtual machine 808. A script 810 receives and consumes the selected virtual machine configuration. The script 810 sends and receives commands via secure shell communication 812 to network interface card 814. In turn, network interface card 814 communicates with virtual network interface card 816 using one or more secure shell keys. In turn, secure shell communication 818 commands are transmitted to virtual disk 826, which contains the virtual operating system. An image 820 is generated and then is installed onto the three virtual disks, including virtual disk 822, which includes applications; virtual disk 824, which includes a database; and virtual disk 826.

After the virtual machine 808 and virtual disks are configured, the host operating system 804 shuts down the virtual machine 808 and may remove any unnecessary or undesirable or other data, as described above. Removal of data considered unnecessary or undesirable may be performed either during or after shutdown. The host operating system 804 or the virtual machine 808 may create a tarball of the three virtual disks. One or more configuration files, or other data, may be added to the tarball. The user may then store the tarball or distribute the tarball, as desired, for later installation onto either physical or virtual machines.

In an embodiment, a private network between the host operating system 804 and the user 802 may provide a number of advantages. For example, a private network may provide for graceful shut down of the virtual machine 808. The ability to gracefully shut down a virtual machine may be important in some non-limiting embodiments in order to prevent potential file system corruption. Furthermore, while most hypervisors may provide the ability to shut down virtual machines, when building a lightweight embedded virtual machine where services like Advanced Configuration for Power Interface (ACPI) do not exist, the events sent from the hypervisor 806 may not be seen by the virtual machine 808. A private network between the host operating system 804 and the user 802 may resolve this issue.

A private network between the host operating system 804 and the user 802 may have another advantage, in addition to graceful shut down of virtual machines. In particular, such a network may provide a channel for exchanging configuration data between the host and guest in order to customize the virtual machine being created. When building closed virtual machines, it may be important in some non-limiting embodiments that the created image be configured in such a way that the image is optimized for ease of use. For example, the image may be installable, configurable, and packaged in a ready to use form that may be easily deployed on a server. Having this communication channel may allow a vast variety of commands or scripts to be executed on virtual machine 808.

Figure 9:
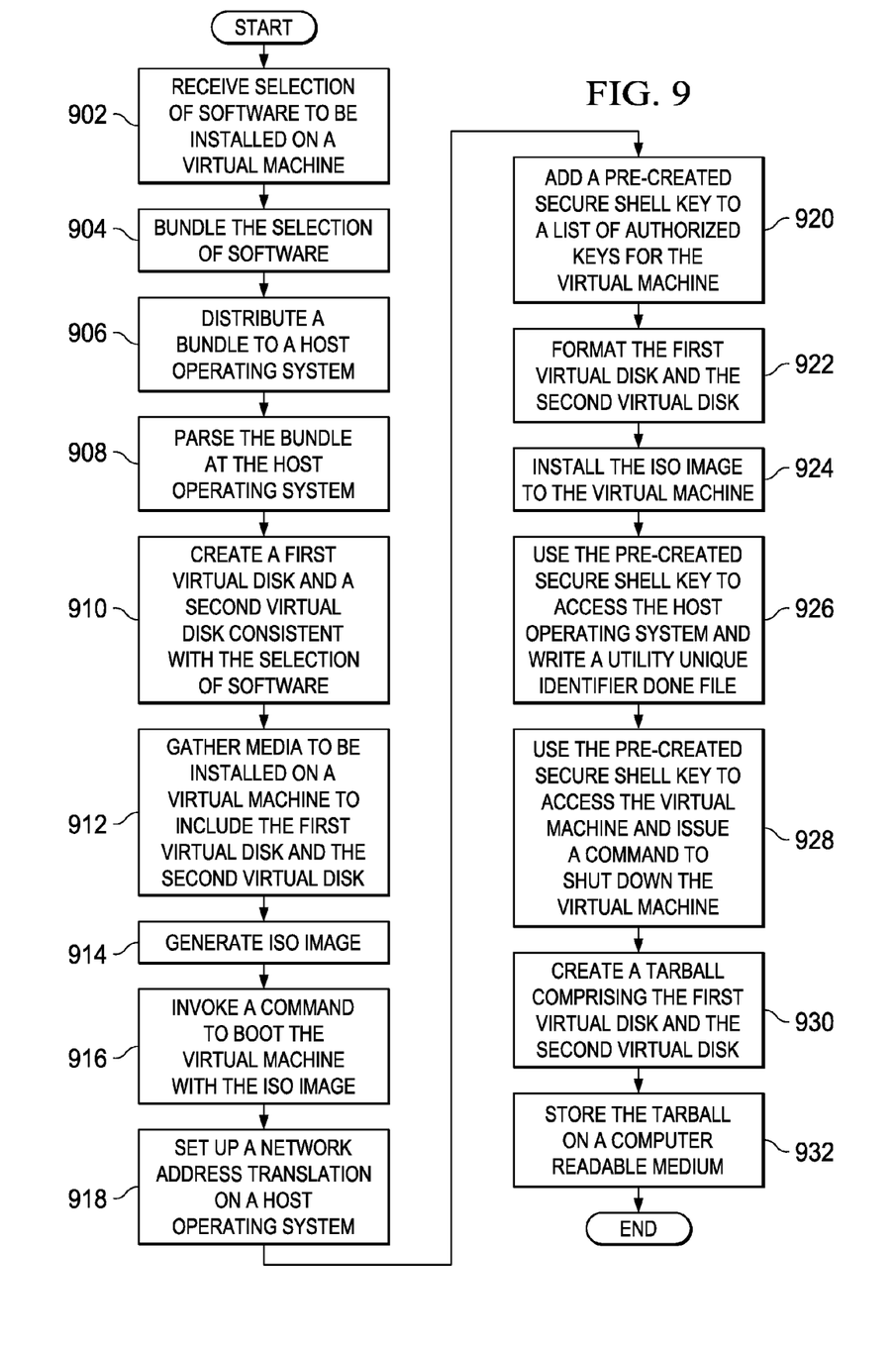
FIG. 9 is a flowchart of a process for creating a transferable image of a machine, in accordance with an illustrative embodiment.

FIG. 9 is a flowchart of a process for creating a transferable image of a machine, in accordance with an illustrative embodiment. The process 900 shown in FIG. 9 may be implemented in one or more data processing systems or networks, such as those shown in FIGS. 1 through 3. The exemplary process described in FIG. 9 is non-limiting, as other embodiments are described further herein. The process shown in FIG. 9 may be implemented in an image management environment, such as image management environment 400 shown in FIG. 4. The process described in FIG. 9 is described in relation to a processor performing the corresponding steps, blocks, or functions; however, multiple processors might be used and the processor might implement the steps using software, or physical hardware might take the place of software.

The process beings as a processor receives selection of software to be installed on a virtual machine (step 902). The processor bundles the selection of software (step 904). Bundling may be performed by any convenient means, such as but not limited to using a Zip file, or other file compression, or by associating the files together using metadata. The software may be bundled for ease of distribution. Thereafter, the processor distributes a bundle to a host operating system (step 906), and parses the bundle at the host operating system (step 908). The processor then creates a first virtual disk and a second virtual disk consistent with the selection of the software (step 910). The processor gathers media to be installed on a virtual machine to include on the first virtual disk and the second virtual disk (step 912). The media may be arranged on the virtual machine, in one embodiment, exactly as the media is arranged on the device being imaged.

The processor then generates ISO image (step 914). The processor invokes a command to boot the virtual machine with the ISO image (step 916). The processor then sets up a network address translation (NAT) on a host operating system (step 918). The network address translation may be used such that any request to a specified port may be forwarded to the virtual machine. In this manner, among others, information may be transferred from the disks to be imaged to the corresponding disk images. As a result, the image will contain not just one disk having all of the information in the first and second disks to be imaged, but will contain first and second disk images having the corresponding information that was also present on the first and second disks to be imaged. Another example of this result may be seen with respect to FIG. 6, particularly with respect to operating system 612, applications 614, and database 616.

The processor may add a pre-created secure shell key to a list of authorized keys for the virtual machine (step 920). The secure shell keys allow users or other software to access the virtual machine, as explained further in below. The processor then formats the first virtual disk and the second virtual disk (step 922).

The processor installs the ISO image to the virtual machine (step 924). Next, the processor uses the pre-created secure shell key to access the host operating system and write a utility unique identifier done file (step 926). The processor also uses the pre-created secure shell key to access the virtual machine and issue a command to shut down the virtual machine (step 928). Optionally, during shut down, the processor may clean up any undesirable or unnecessary files or other data present in the virtual machine.

The processor then creates a tarball comprising the first virtual disk and the second virtual disk (step 930). Finally, the processor stores the tarball on a computer readable medium (step 932). The process terminates thereafter.

Figure 10:
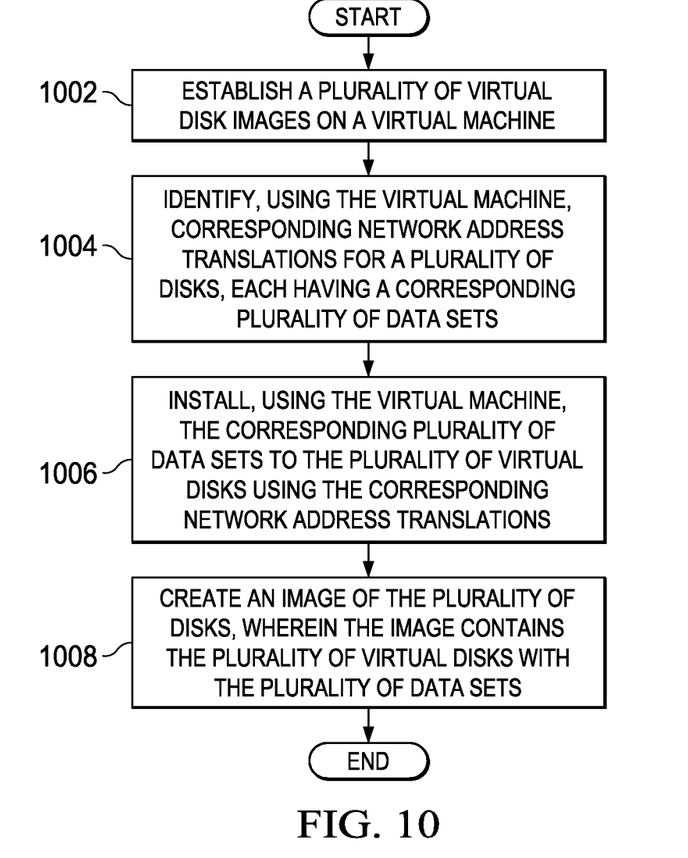
FIG. 10 is a flowchart of a process for creating a transferable image of a machine, in accordance with an illustrative embodiment.

FIG. 10 is a flowchart of a process for creating a transferable image of a machine, in accordance with an illustrative embodiment. The process 1000 shown in FIG. 10 may be implemented in one or more data processing systems or networks, such as those shown in FIGS. 1 through 3. The exemplary process described in FIG. 10 is non-limiting, as other embodiments are described further herein. The process shown in FIG. 10 may be implemented in an image management environment, such as image management environment 400 shown in FIG. 4. The process described in FIG. 10 is described in relation to a processor performing the corresponding steps, blocks, or functions; however, multiple processors might be used and the processor might implement the steps using software, or physical hardware might take the place of software.

The process begins as the processor establishes a plurality of virtual disk images on a virtual machine (step 1002). The processor identifies, using the virtual machine, corresponding network address translations for a plurality of disks, each having a corresponding plurality of data sets (step 1004). The processor installs, using the virtual machine, the corresponding plurality of data sets to the plurality of virtual disks using the corresponding network address translations (step 1006). The processor creates an image of the plurality of disks, wherein the image contains the plurality of virtual disks with the plurality of data sets (step 1008). The process terminates thereafter.

Thus, the embodiments provide for a computer implemented method implemented by a processor. A plurality of virtual disk images is established on a virtual machine. The virtual machine identifies corresponding network address translations for a plurality of disks, each having a corresponding plurality of data sets. The virtual machine installs the corresponding plurality of data sets to the plurality of virtual disks using the corresponding network address translations. An image of the plurality of disks is created, wherein the image contains the plurality of virtual disks with the plurality of data sets.

In another embodiment, the virtual machine is booted using an installable image of a device having the plurality of disks. In still another embodiment, any data not related to the plurality of sets of data is removed from the virtual machine. In yet another embodiment, responsive to creating the image of the plurality of disks, the virtual machine is stopped and the image of the plurality of disks is stored. In a further embodiment the image is installed onto a physical computer.

In yet another embodiment, the installable image further includes a plurality of pre-created secure shell keys, operating systems for the plurality of virtual disks, applications to install to the plurality of virtual disks, virtual disk layouts for the plurality of virtual disks, and a boot service configured to query all of a presence of a disk configuration, at least one application, at least one script to install and clean up data, and at least one pre-created secure shell. In a further embodiment a pre-created secure shell key is added to a list of authorized keys on a host operating system on which the virtual machine is running, wherein during installation of the installable image, the pre-created secure shell key is added to the list of authorized keys for the virtual machine; the pre-created secure shell key is used to access the host operating system and write a utility unique identifier done file; and the pre-created secure shell key is used to access the virtual machine and issue a command to shut down the virtual machine.

The embodiments also provide for a computer implemented method implemented by a processor. A selection of software to be installed on a virtual machine is received, wherein the selection of software relates to a first disk and a second disk. The selection of software is bundled, distributed to a host, and parsed at the host. A first virtual disk and a second virtual disk are created consistent with the selection of software. Media to be installed on a virtual machine, which is to include the first virtual disk and the second virtual disk, is gathered. An installable image is created. The installable image may be writable to a computer readable medium. A command is invoked to boot the virtual machine with the installable image. A network address translation is setup on a host operating system such that any request to a specified port will be forwarded to the virtual machine and such that information related to the first disk can be forwarded to a first image of the first disk, and such that information related to the second disk can be forwarded to a second image of the second disk. The first virtual disk and the second virtual disk are formatted. The image is installed to the virtual machine such that the first virtual disk represents a first image of the first disk and the second virtual disk represents a second image of the second disk. A tarball is created, the tarball comprising the first virtual disk and the second virtual disk. The tarball is stored on a computer readable medium.

In an embodiment, the first disk comprises one of a third virtual disk and a first physical disk and wherein the second disk comprises one of a fourth virtual disk and a second physical disk. In another embodiment, the image comprises an International Organization for Standards image that further comprises at least one patch, and at least one script that drives installation and cleanup of the virtual machine.

In yet another embodiment, the International Organization for Standards image further includes a plurality of pre-created secure shell keys, and wherein the International Organization for Standards image comprises all of first and second operating systems for the first and second virtual disks, first and second applications to install to the first and second virtual disks, first and second virtual disk layouts for the first and second virtual disks, and a boot service, wherein the boot service is configured to query all of a presence of a disk configuration, at least one application, at least one script to install and clean up data, and at least one pre-created secure shell.

In still another embodiment, a pre-created secure shell key is added to a list of authorized keys on the host operating system, wherein during installation, the pre-created secure shell key is added to the list of authorized keys for the virtual machine. The pre-created secure shell key is used to access the host operating system and write a utility unique identifier done file. The pre-created secure shell key is used to access the virtual machine and issue a command to shut down the virtual machine. Responsive to creating the tarball, a configuration file is added to the tarball.

In another embodiment, the pre-created secure shell key is removed. Data not required by the virtual machine is removed. Residual installation files are cleaned up, network configurations are removed, and the boot service is removed.

In yet another embodiment, the first and second virtual disks are installed from the tarball onto first and second physical disks.

The flowcharts and block diagrams in the different depicted embodiments illustrate the architecture, functionality, and operation of some possible implementations of apparatus and methods in different illustrative embodiments. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

According to an embodiment of the invention, a computer implemented method implemented by a processor is provided. The computer implemented method presented below may be stored in executable form on a computer readable medium, and may also be implemented in hardware or software on a device such as a computer. The computer implemented method presented below is exemplary only, and many other embodiments are possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the inventions has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method implemented by a processor, the computer implemented method comprising:
    establishing a plurality of virtual disks on a virtual machine;
    identifying, by the virtual machine, corresponding network address translations for a plurality of disks, each having a corresponding plurality of data sets;
    installing, using the virtual machine, the corresponding plurality of data sets to the plurality of virtual disks using the corresponding network address translations;
    creating an installable image of the plurality of disks, wherein the installable image contains the plurality of virtual disks with the plurality of data sets, wherein the installable image further includes a plurality of pre-created secure shell keys, operating systems for the plurality of virtual disks, applications to install to the plurality of virtual disks, virtual disk layouts for the plurality of virtual disks, and a boot service configured to query all of a presence of a disk configuration, at least one application, at least one script to install and clean up data, and at least one pre-created secure shell; and
    booting the virtual machine using the installable image of the plurality of disks.

2. The computer implemented method of claim 1 further comprising:
    removing from the virtual machine any data not related of the plurality of sets of data;
    responsive to creating the image of the plurality of disks, stopping the virtual machine; and
    storing the image of the plurality of disks.

3. The computer implemented method of claim 2 further comprising:
    installing the image onto a physical computer.

4. The computer implemented method of claim 1 further comprising:
    adding a pre-created secure shell key to a list of authorized keys on a host operating system on which the virtual machine is running, wherein during installation of the installable image, the pre-created secure shell key is added to the list of authorized keys for the virtual machine;
    using the pre-created secure shell key to access the host operating system and write a utility unique identifier done file; and
    using the pre-created secure shell key to access the virtual machine and issue a command to shut down the virtual machine.

5. A computer implemented method implemented by a processor, the computer implemented method comprising:
    receiving a selection of software to be installed on a virtual machine, wherein the selection of software relates to a first disk and a second disk;
    bundling the selection of software;
    distributing the bundle to a host;
    parsing the bundle at the host;
    creating a first virtual disk and a second virtual disk consistent with the selection of software;
    gathering media to be installed on a virtual machine to include the first virtual disk and the second virtual disk;

creating an installable image which is writable to a computer readable medium;
invoking a command to boot the virtual machine with the installable image;
setting up a network address translation on a host operating system such that any request to a specified port will be forwarded to the virtual machine and such that information related to the first disk can be forwarded to a first image of the first disk, and such that information related to the second disk can be forwarded to a second image of the second disk;
formatting the first virtual disk and the second virtual disk;
installing the image to the virtual machine such that the first virtual disk represents a first image of the first disk and the second virtual disk represents a second image of the second disk;
creating a tarball comprising the first virtual disk and the second virtual disk; and
storing the tarball on a computer readable medium.

6. The computer implemented method of claim 5, wherein the first disk comprises one of a third virtual disk and a first physical disk and wherein the second disk comprises one of a fourth virtual disk and a second physical disk.

7. The computer implemented method of claim 6, wherein the image comprises an International Organization for Standards image that further comprises at least one patch, and at least one script that drives installation and cleanup of the virtual machine.

8. The computer implemented method of claim 7, wherein the International Organization for Standards image further includes a plurality of pre-created secure shell keys, and wherein the International Organization for Standards image comprises all of first and second operating systems for the first and second virtual disks, first and second applications to install to the first and second virtual disks, first and second virtual disk layouts for the first and second virtual disks, and a boot service, wherein the boot service is configured to query all of a presence of a disk configuration, at least one application, at least one script to install and clean up data, and at least one pre-created secure shell.

9. The computer implemented method of claim 8 further comprising:
adding a pre-created secure shell key to a list of authorized keys on the host operating system, wherein during installation, the pre-created secure shell key is added to the list of authorized keys for the virtual machine;
using the pre-created secure shell key to access the host operating system and write a utility unique identifier done file;
using the pre-created secure shell key to access the virtual machine and issue a command to shut down the virtual machine;
responsive to creating the tarball, adding a configuration file to the tarball.

10. The computer implemented method of claim 9 further comprising:
removing the pre-created secure shell key;
removing data not required by the virtual machine;
cleaning up residual installation files;
removing network configurations; and
removing the boot service.

11. The computer implemented method of claim 10 further comprising:
installing the first and second virtual disks from the tarball onto first and second physical disks.

12. A computer program product comprising:
a non-transitory computer readable storage medium having computer readable program code embodied therewith, the computer readable program code comprising:
computer readable program code for receiving a selection of software to be installed on a virtual machine, wherein the selection of software relates to a first disk and a second disk;
computer readable program code for bundling the selection of software;
computer readable program code for distributing the bundle to a host;
computer readable program code for parsing the bundle at the host;
computer readable program code for creating a first virtual disk and a second virtual disk consistent with the selection of software;
computer readable program code for gathering media to be installed on a virtual machine to include the first virtual disk and the second virtual disk;
computer readable program code for creating an installable image which is writable to a computer readable medium;
computer readable program code for invoking a command to boot the virtual machine with the installable image;
computer readable program code for setting up a network address translation on a host operating system such that any request to a specified port will be forwarded to the virtual machine and such that information related to the first disk can be forwarded to a first image of the first disk, and such that information related to the second disk can be forwarded to a second image of the second disk;
computer readable program code for formatting the first virtual disk and the second virtual disk;
computer readable program code for installing the image to the virtual machine such that the first virtual disk represents a first image of the first disk and the second virtual disk represents a second image of the second disk;
computer readable program code for creating a tarball comprising the first virtual disk and the second virtual disk; and
computer readable program code for storing the tarball on a computer readable medium.

13. The computer program product of claim 12, wherein the first disk comprises one of a third virtual disk and a first physical disk and wherein the second disk comprises one of a fourth virtual disk and a second physical disk.

14. The computer program product of claim 13, wherein the image comprises an International Organization for Standards image that further comprises at least one patch, and at least one script that drives installation and cleanup of the virtual machine.

15. The computer program product of claim 14, wherein the International Organization for Standards image further includes a plurality of pre-created secure shell keys, and wherein the International Organization for Standards image comprises all of first and second operating systems for the first and second virtual disks, first and second applications to install to the first and second virtual disks, first and second virtual disk layouts for the first and second virtual disks, and a boot service, wherein the boot service is configured to query all of a presence of a disk configuration, at least one application, at least one script to install and clean up data, and at least one pre-created secure shell.

16. The computer program product of claim 15 further comprising:
computer readable program code for adding a pre-created secure shell key to a list of authorized keys on the host operating system, wherein during installation, the pre-created secure shell key is added to the list of authorized keys for the virtual machine;

computer readable program code for using the pre-created secure shell key to access the host operating system and write a utility unique identifier done file;

computer readable program code for using the pre-created secure shell key to access the virtual machine and issue a command to shut down the virtual machine;

computer readable program code for responsive to creating the tarball, adding a configuration file to the tarball.

17. The computer program product of claim 16 further comprising:

computer readable program code for removing the pre-created secure shell key;

computer readable program code for removing data not required by the virtual machine;

computer readable program code for cleaning up residual installation files;

computer readable program code for removing network configurations; and computer readable program code for removing the boot service.

18. The computer program product of claim 17 further comprising:

computer readable program code for installing the first and second virtual disks from the tarball onto first and second physical disks.

* * * * *